Patented Aug. 21, 1945

2,383,318

UNITED STATES PATENT OFFICE 2,383,318

TETRAALKYLTHIURAM MONOSULPHIDE PREPARATION

Eric Kay, Blackley, Manchester, England, assignor to Imperial Chemical Industries Limited, a corporation of Great Britain No Drawing. Application April 27, 1944, Serial No. 533,084. In Great Britain November 16, 1942

4 Claims. (Cl. 167—58)

This invention relates to preparations containing tetra-alkyl thiuram sulphides and more particularly to so-called "miscible oils," and aqueous emulsions made therefrom by mixing with water, the active ingredient in the said preparations being a tetra-alkyl thiuram sulphide, or more specifically tetramethyl or tetraethyl thiuram mono or disulphide.

I have found that tetra-alkyl thiuram sulphides can be made into solutions in water by the aid of sodium dibenzylsulphanilate with or without benzyl alcohol, cyclohexanol, $\beta$-toloxyethanol or a fatty alcohol containing not more than 8 carbon atoms. These solutions are so-called "miscible oils"; they are converted to emulsions on diluting with water and these emulsions are stable. Concentrated solutions can be obtained. This means that the tetra-alkyl thiuram sulphide can be made into a solution for storage and transport purposes and that when it is required for use the solution can be readily made into an emulsion merely by stirring into water and the emulsion then applied for the purposes required. The addition of the benzyl or other alcohol is usually desirable if solutions containing more than about 10% of their weight of the tetra-alkyl thiuram sulphide are required, as without the alcohol solutions of these strengths tend to deposit crystals upon standing. I have also found that similar results may be obtained by using the potassium, ammonium or triethanolamine salts of dibenzylsulphanilic acid instead of the sodium salt.

Accordingly my invention comprises solutions of a tetra-alkyl thiuram sulphide in water containing dissolved sodium, potassium, ammonium or triethanolamine salts of dibenzylsulphanilic acid, with, if desired, dissolved benzyl alcohol, cyclohexanol, $\beta$-toloxyethanol or a fatty alcohol containing not more than 8 carbon atoms.

My invention also comprises the process of producing emulsions which comprises mixing the said solutions with additional water and also the emulsions so obtained.

The following examples in which parts are by weight illustrate but do not limit the invention.

Example 1

10 parts of tetraethylthiuram monosulphide are melted and mixed with 15 parts of sodium dibenzylsulphanilate and 75 parts of water are then added. The mixture is warmed to 35° C. and stirred till a clear solution is obtained which may be diluted with water for bathing the affected parts of persons suffering from scabies or of animals suffering from mange.

Example 2

30 parts of tetraethylthiuram monosulphide, 20 parts of benzyl alcohol, 10 parts of sodium dibenzylsulphanilate and 40 parts of water are mixed for about half an hour. The clear greenish-brown liquid so obtained mixes readily with water to give a yellow emulsion which may be used for bathing the affected parts of persons suffering from scabies or of animals suffering from mange.

Example 3

16 parts of tetraethylthiuram monosulphide, 14 parts of $\beta$-toloxyethanol, 12 parts of sodium dibenzylsulphanilate and 58 parts of water are warmed to 35° C. and mixed until a clear solution is obtained. This solution readily mixes with water, forming a yellow emulsion which is suitable for bathing the affected parts of persons suffering from scabies or of animals suffering from mange.

Example 4

17 parts of cyclohexanol and 21 parts of tetraethylthiuram monosulphide are heated to 35° C. and mixed. 13 parts of potassium dibenzylsulphanilate and 49 parts of water are then added and the mixture is maintained at 35° C. and stirred until it has formed a clear solution. This solution mixes readily with water, forming a yellow emulsion which is useful in the treatment of scabies and mange.

Example 5

48 parts of water, 17 parts of n-hexyl alcohol, 15 parts of ammonium dibenzylsulphanilate and 20 parts of tetraethylthiuram monosulphide are stirred and heated together at 35° C. A clear solution is obtained which mixes readily with water forming a yellow emulsion which is suitable for bathing the skin of persons suffering from scabies or of animals affected with mange.

Instead of the tetra-ethyl thiuram monosulphide of the above examples, I may use tetraethylthiuram disulphide or tetra-methylthiuram mono or disulphide.

Whilst the above examples illustrate several embodiments of my invention it will be apparent to one skilled in the art that many other variations may be made without departing from the spirit and scope thereof and accordingly it is to be understood that my invention is not in any way limited except as indicated in the following claims.

I claim:
1. A self-emulsifiable composition comprising a tetraalkylthiuram sulphide, water, and a compound selected from the class consisting of sodium, potassium, ammonium, and triethanolamine salts of dibenzylsulphanilic acid, the proportions being such as to give a clear solution.

2. A self-emulsifiable composition comprising a tetraalkylthiuram sulphide, water, and a compound selected from the class consisting of sodium, potassium, ammonium, triethanolamine salts of dibenzylsulphanilic acid, and an alcohol selected from the class consisting of benzyl alcohol, cyclohexanol, beta-toloxyethanol, and a fatty alcohol containing not more than 8 carbon atoms, the proportions being such as to give a clear solution.

3. A self-emulsifiable composition comprising a tetra-ethyl thiuram monosulphide, water, and a compound selected from the class consisting of sodium, potassium, ammonium, and triethanolamine salts of dibenzylsulphanilic acid, and an alcohol selected from the class consisting of benzyl alcohol, cyclohexanol, beta-toloxyethanol, and a fatty alcohol containing not more than 8 carbon atoms, the proportions being such as to give a clear solution.

4. A self-emulsifiable composition comprising a tetraalkylthiuram sulphide, water, and a compound selected from the class consisting of sodium, potassium, ammonium, triethanolamine salts of dibenzylsulphanilic acid, and an alcohol selected from the class consisting of benzyl alcohol, cyclohexanol, beta-toloxyethanol, and hexyl alcohol.

ERIC KAY.